US008983949B2

(12) United States Patent
Emmett et al.

(10) Patent No.: US 8,983,949 B2

(45) Date of Patent: Mar. 17, 2015

(54) AUTOMATIC DISPLAY OF WEB CONTENT TO SMALLER DISPLAY DEVICES: IMPROVED SUMMARIZATION AND NAVIGATION

(76) Inventors: David Emmett, Palo Alto, CA (US); Ahmad Rahman, San Jose, CA (US)

( * ) Notice: Subject to any disclaimer, the term of this patent is extended or adjusted under 35 U.S.C. 154(b) by 561 days.

(21) Appl. No.: 11/510,467

(22) Filed: Aug. 24, 2006

(65) Prior Publication Data

US 2007/0061415 A1 Mar. 15, 2007

Related U.S. Application Data

(63) Continuation of application No. 10/142,393, filed on May 8, 2002, now abandoned, which is a continuation of application No. 10/076,786, filed on Feb. 14, 2002, now abandoned.

(60) Provisional application No. 60/269,498, filed on Feb. 16, 2001, provisional application No. 60/284,354, filed on Apr. 16, 2001.

(51) Int. Cl.
*G06F 17/30* (2006.01)

(52) U.S. Cl.
CPC .................................. *G06F 17/30905* (2013.01)
USPC ........... 707/730; 707/726; 707/727; 707/728; 707/729; 707/731

(58) Field of Classification Search
CPC .................................. G06F 17/30; G06F 17/00
See application file for complete search history.

(56) References Cited

U.S. PATENT DOCUMENTS

| | | | | |
|---|---|---|---|---|
| 5,737,442 A | | 4/1998 | Alam | |
| 5,893,094 A | * | 4/1999 | Horowitz | 1/1 |
| 5,907,840 A | * | 5/1999 | Evans | 1/1 |
| 5,956,422 A | | 9/1999 | Alam | |
| 5,983,267 A | | 11/1999 | Shklar et al. | |
| 5,999,925 A | * | 12/1999 | Evans | 1/1 |
| 5,999,939 A | | 12/1999 | de Hilster et al. | |
| 6,070,133 A | * | 5/2000 | Brewster et al. | 704/9 |
| 6,104,500 A | | 8/2000 | Alam et al. | |
| 6,112,204 A | * | 8/2000 | Horowitz | 1/1 |
| 6,115,706 A | * | 9/2000 | Evans | 1/1 |

(Continued)

OTHER PUBLICATIONS

Rahman, Ahmad Fuad Rezaur, et al. "Automatic summarization of web content to smaller display devices." Document Analysis and Recognition, 2001. Proceedings. Sixth International Conference on. IEEE, 2001, pp. 1064-1068 (5 total pages).*

(Continued)

*Primary Examiner* — Farhan Syed

(74) *Attorney, Agent, or Firm* — Sonia Cooper; Jim Ross; Micky Minhas

(57) ABSTRACT

A system and method are disclosed for modifying a document format. In one embodiment, a structure of a first document is extracted to form a first data structure, including multiple subdocuments, each subdocument having a label assigned thereto. A table of contents listing the labels of the subdocuments is then generated. The various labels are then ordered according to the amount of text of the associated subdocument, a comparison of the text of a previous link and the text of the associated subdocument, a comparison of the text of the previous document and the text of the associated subdocument, a comparison of the text of the previous link and the text of the associated subdocument, or a combination of these.

19 Claims, 8 Drawing Sheets

600

Receive request for a document — 602
Retrieve the requested document — 604
Extract structure of retrieved document — 606
Assign classifications — 608
Assign labels — 610
Merge nodes based on classification — 612
Convert data structure to a list — 614
Re-order list entries — 616
618 Does navigation rules database contain an entry associated with the list of document content? — No / Yes
Create a new data tree structure — 620
Store output file — 622
Transmit table of contents page — 624

(56) References Cited

U.S. PATENT DOCUMENTS

| | | | | |
|---|---|---|---|---|
| 6,125,391 | A | 9/2000 | Meltzer et al. | |
| 6,128,655 | A | 10/2000 | Fields et al. | |
| 6,138,114 | A * | 10/2000 | Horowitz | 1/1 |
| 6,205,443 | B1 * | 3/2001 | Evans | 1/1 |
| 6,253,239 | B1 | 6/2001 | Shklar et al. | |
| 6,278,990 | B1 * | 8/2001 | Horowitz | 1/1 |
| 6,298,357 | B1 | 10/2001 | Wexler et al. | |
| 6,336,124 | B1 | 1/2002 | Alam et al. | |
| 6,377,947 | B1 * | 4/2002 | Evans | 1/1 |
| 6,377,957 | B1 | 4/2002 | Heyaraman | |
| 6,421,656 | B1 | 7/2002 | Cheng et al. | |
| 6,438,575 | B1 | 8/2002 | Khan et al. | |
| 6,457,030 | B1 | 9/2002 | Adams et al. | |
| 6,473,755 | B2 * | 10/2002 | Evans | 707/748 |
| 6,505,198 | B2 * | 1/2003 | Horowitz | 1/1 |
| 6,549,221 | B1 * | 4/2003 | Brown et al. | 715/854 |
| 6,549,916 | B1 | 4/2003 | Sedlar | |
| 6,812,941 | B1 * | 11/2004 | Brown et al. | 715/854 |
| 6,857,102 | B1 * | 2/2005 | Bickmore et al. | 715/205 |
| 7,565,605 | B2 * | 7/2009 | Schohn et al. | 715/249 |
| 7,660,819 | B1 * | 2/2010 | Frieder et al. | 707/999.107 |
| 2001/0042061 | A1 * | 11/2001 | Evans | 707/1 |
| 2002/0038349 | A1 * | 3/2002 | Perla et al. | 709/217 |
| 2002/0059346 | A1 * | 5/2002 | Horowitz | 707/513 |
| 2002/0059367 | A1 * | 5/2002 | Romero et al. | 709/203 |
| 2002/0062325 | A1 | 5/2002 | Berger et al. | |
| 2002/0073235 | A1 | 6/2002 | Chen et al. | |
| 2002/0099739 | A1 * | 7/2002 | Fischer | 707/515 |
| 2003/0046318 | A1 * | 3/2003 | Schohn et al. | 707/513 |
| 2004/0003028 | A1 * | 1/2004 | Emmett et al. | 709/203 |
| 2004/0133635 | A1 * | 7/2004 | Spriestersbach et al. | 709/203 |
| 2005/0055420 | A1 | 3/2005 | Wyler | |
| 2006/0235855 | A1 * | 10/2006 | Rousseau et al. | 707/100 |
| 2007/0061415 | A1 * | 3/2007 | Emmett et al. | 709/217 |
| 2007/0198952 | A1 * | 8/2007 | Pittenger | 715/853 |
| 2010/0169329 | A1 * | 7/2010 | Frieder et al. | 707/752 |

OTHER PUBLICATIONS

Rahman, A. F. R., H. Alam, and R. Hartono. "Content extraction from html documents." In 1st Int. Workshop on Web Document Analysis (WDA2001). 2001, pp. 1-4.*

Rahman, A. F. R., H. Alam, and R. Hartono. "Understanding the flow of content in summarizing html documents." In Int. Workshop on Document Layout Interpretation and its Applications, DLIA01. 2001, pp. 1-4.*

Rahman et al., "Automatic Summarization of Web Content to Smaller Display Devices," Sep. 12, 2001, ICDAR '01 Final Program.

"Final Office Action", U.S. Appl. No. 10/142,393, (Feb. 24, 2006), 5 pages.

"Non-Final Office Action", U.S. Appl. No. 10/076,786, (May 6, 2004), 13 pages.

"Non-Final Office Action", U.S. Appl. No. 10/076,786, (Nov. 23, 2005), 13 pages.

"Non-Final Office Action", U.S. Appl. No. 10/142,393, (May 19, 2005), 19 pages.

* cited by examiner

AUTOMATIC DISPLAY OF WEB CONTENT TO SMALLER DISPLAY DEVICES: IMPROVED SUMMARIZATION AND NAVIGATION

CROSS-REFERENCE TO RELATED APPLICATIONS

This application is a continuation of U.S. patent application Ser. No. 10/142,393, filed May 8, 2002 now abandoned and entitled "Automatic Display of Web Content to Smaller Display Devices: Improved Summarization and Navigation", which is a continuation of U.S. patent application Ser. No. 10/076,786, filed Feb. 14, 2002 now abandoned and entitled "System and Method for Modifying a Document Format", which claims priority to U.S. Provisional Patent Application Ser. No. 60/269,498, filed Feb. 16, 2001; U.S. Provisional Patent Application Ser. No. 60/284,354, filed Apr. 16, 2001; and U.S. Provisional Patent Application entitled "Automatic Display of Web Content to Smaller Display Devices: Improved Summarization and Navigation", filed on May 10, 2001.

TECHNICAL FIELD

The present invention relates to a system and method for modifying a document format.

BACKGROUND

Handheld devices, including Personal Digital Assistants (PDAs) and cellular telephones, offer connectivity to the Internet and permit access to documents available over the Internet. Wireless Application Protocol (WAP) is a standard for providing cellular phones, PDAs, pagers and other handheld devices with secure access to web pages. WAP features the Wireless Markup Language (WML), which generally serves as a medium for translating web-based HTML content into a format that accommodates small form factor displays and key sets found on conventional handheld devices. WML also allows handheld device manufacturers to include micro-browsers in their products that accept WML input from a WAP-based system across vast regions of the world.

The proliferation of wireless PDAs has also created a popular means for handheld Internet access. However, presenting IP-based content, and other content developed for display on large form factor devices (e.g., PC monitors), on small form factor screens of handheld devices has, in the past, been problematic. Two primary methods of presenting such content to handheld devices have been employed.

The first such method can be termed "fixed mapping". Fixed mapping typically involves rewriting an existing document, such as an HTML-based web page, to conform to a specific standard, such as WAP, J-PHONE, or i-Mode, or to a small display device. A web server must then maintain the rewritten web site as a separate site with its own URL in addition to the original document. As new content is added to the original document, a web site operator must manually trim, edit, and condense the new content by rewriting the new content into a format that will accommodate the interface parameters of handheld devices. This method is limited in that considerable time and expense are typically required to maintain the two web sites in parallel. Further, the manual editing of the rewritten web site can be time-consuming, burdensome, and expensive.

The second method may be termed "transcoding". Transcoding typically involves the use of software that takes the entire content of a web site as input, converts the entire content into a format of a specific handheld wireless standard for transmission to handheld devices. The entire content, as formatted according to a handheld wireless standard, is then transmitted to the handheld device. This conversion may be performed "on-the-fly" (i.e., automatically in real time) or may be performed manually.

Transcoding has the advantage of reducing the investment to reach wireless markets since it leverages existing web sites. From a user standpoint, transcoding is desirable in that it preserves all the text-based information from the originating site. For large volumes of text, however, using this approach may overwhelm the handheld device user with large volumes of text to be viewed on a small form factor display. Further, the unorganized transcoded content makes changes or modifications to the wirelessly enabled web site more difficult for the web site operator.

In addition, many wireless handheld devices have limited bandwidth. Thus, downloading an entire web page designed for viewing on a large form factor device at data rates common to handheld wireless devices may require large download times. These large download times may be burdensome to the user who must wait while the entire web page downloads, even though the user may only desire to view a portion of the web page. Further, these large download times may be expensive for users who pay for wireless service based on the amount of time or the number of packets downloaded. For example, service plans are time-based or packet-based. These service plans charge on either the time connected or number of packets received, respectively, Thus, large downloads under these service plans will be more expensive than smaller downloads.

Additional background details are disclosed in U.S. Pat. No. 6,336,124, the disclosure of which is hereby incorporated by reference.

SUMMARY

Accordingly, a need exists to provide a system and method for presenting content developed for display on large form factor devices (e.g., PC monitors) on small form factor screens of handheld devices. In particular, a need exists for a system and method for permitting a handheld device user to easily navigate material available over a network, such as an Internet web site.

Pursuant to one embodiment of the present invention, a method of ranking entries in a table of contents for display at a client device includes transmitting a first document from an application server over a network, such as the Internet, to the client device. The first document includes text and at least one link. The application server then receives a request for a second document associated with the link from the client device. Next, the application server divides the second document into subdocuments and assigns a label to each of a plurality of the subdocuments. The application server also performs a comparison of the text of the first document with the text of each of the plurality of subdocuments to generate a document-document value for each of the plurality of subdocuments according to the degree of association between the first document and the corresponding one of the subdocument. After performing this comparison, the application server ranks the plurality of subdocuments based, at least in part, on the document-document values.

In another embodiment, the application server performs a comparison of the text of the link with the text of each of the subdocuments to generate a link-text value for each of the plurality of subdocuments according to the degree of association between the first document and the corresponding one of the subdocuments. After performing this comparison, the application server ranks the plurality of subdocuments based, at least in part, on the link-text values.

In yet another embodiment, the application server performs a comparison of the text of the link with the label assigned to each of the plurality of subdocuments to generate a link-label value for each of the plurality of subdocuments according to the degree of association between the first document and the corresponding one of the subdocuments. After performing this comparison, the application server ranks the plurality of subdocuments based, at least in part, on the link-label values.

In still another embodiment, the application server generates a size value indicative of an amount of text in each of the plurality of subdocuments for each of the plurality of subdocuments. After generating a size value for each of the plurality of subdocuments, the application server ranks the plurality of subdocuments based, at least in part, by the size value.

In this manner, subdocuments likely to be relevant to the first document, the selected link, or both, are listed at or near the top of a table of contents to facilitate user selection of the same. Hence, users may easily follow a text that spans., multiple documents by having table of contents of a requested page list the subdocuments containing continuing portions of the text listed at or near the top of the table of contents.

Additional details regarding the present system and method may be understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 1:
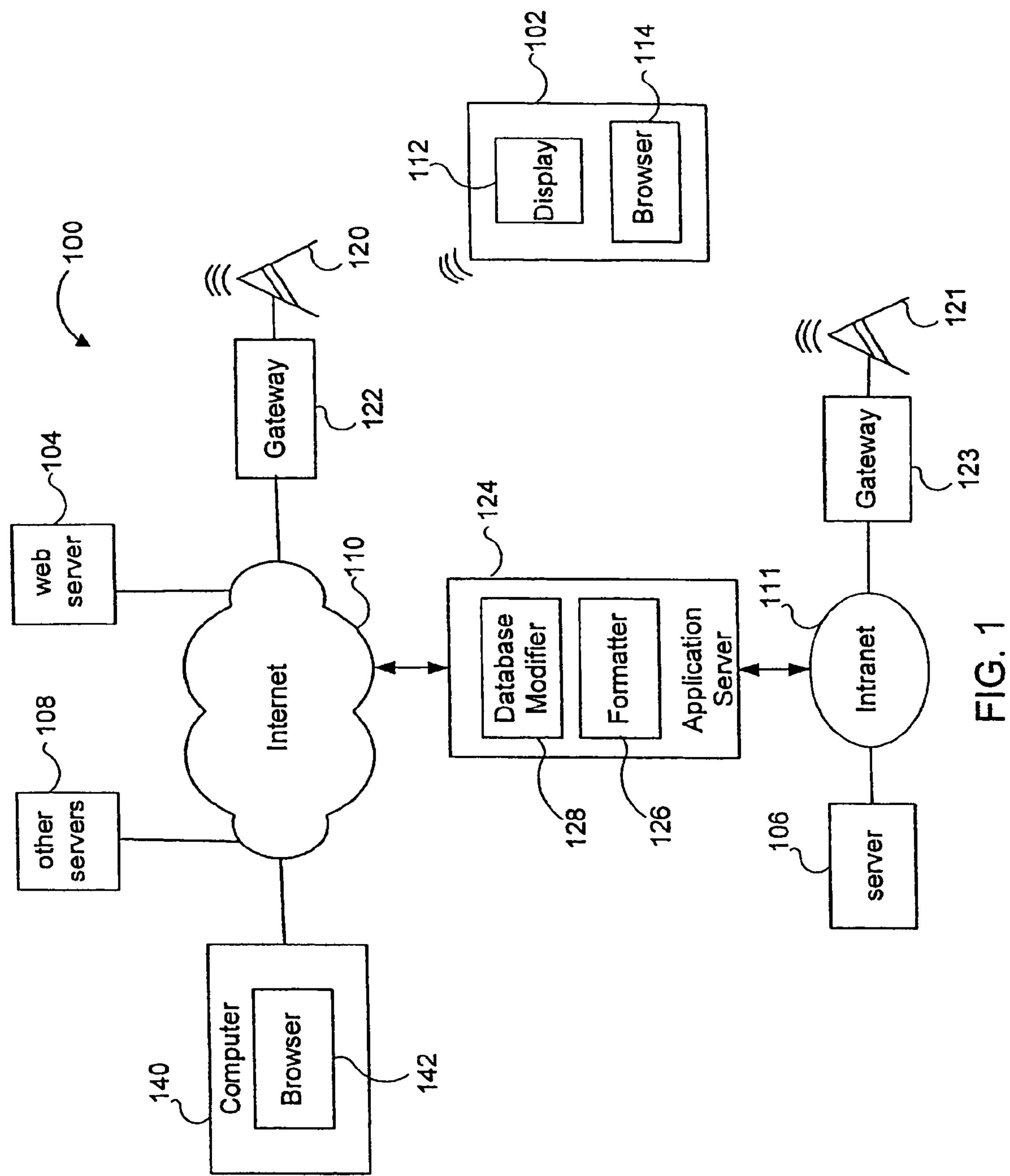
FIG. 1 is a block diagram of a document delivery system in accordance with one embodiment of the present invention.

FIG. 1 illustrates a document delivery system 100 in accordance with one embodiment of the present invention. The document delivery system 100 permits a client 102 to access content of documents (now shown) stored at server 104, server 106, or other servers 108 over a network 110, such as the Internet, and over a network 111, such as an intranet.

In one embodiment, the client 102 comprises a handheld device, such as a PDA (Personal Digital Assistant), a mobile telephone, or the like, having a small form factor display 112. The client 102 also includes a web browser 114. The web browser 114 may comprise a microbrowser designed for small display screens on web-enabled cellular telephones, PDAs and other handheld devices, including wireless handheld devices.

The client 102 may exchange data with the network 110 in a wireless fashion via a wireless station 120 and a gateway 122 in accordance with WAP (Wireless Application Protocol), i-Mode, or other suitable protocol or service. Optionally, the client 102 may exchange data with the network 110 via a wired connection (not shown).

The client 102 may also exchange data with the network 111 in a wireless fashion via a wireless station 121 and a gateway 123 in accordance with WAP (Wireless Application Protocol), i-Mode, or other suitable protocol or service for delivery of web content to small display devices. Optionally, the client 102 may exchange data with the network 111 via a wired connection (now shown).

In one embodiment, the gateways 122, 123 are network devices that connect a wireless network with a wired network, such as the networks 110, 111. Access between the client 102 and application server 124 may also pass through one or more other firewalls (not shown), other gateway devices (not shown), or the like.

Pursuant to one embodiment, the client 102 transmits requests for documents stored on one or more of the servers 104, 106, 108 to the application server 124. The request for content may comprise an HTTP request or other suitable type of request. Moreover, the application server 124 may alternatively receive the request for a document from the client 102 from any network (e.g., 110, 111). The application server 124, among other functionality, functions as a proxy server and receives requests for documents from client devices, such s the client 102, over the networks 110, 111 and provides associated content in response to such requests by transmitting the associated content over at least one of the networks 110, 111.

In response to a request for a document from the client 102, the application server 124 requests the document identified by the request from one or more of the servers 104, 106, 108. Upon receipt of the document identified by the request, the application server 124 modifies the format of the document identified by the request for content using a formatter 126.

In one embodiment, the document identified by the request is an HTML, or XML web page, although other document types, such as PDF (Portable Document Format), may also be requested. The application server 124 then transmits at least a portion of the reformatted content of the document identified by the request to the client 102 in a format compatible with the browser 114 for display at the display 112 of the client 102.

The formatter 126 includes a database (see FIG. 5) that may be configured from a client admin computer 140 via a database modifier 128. The database modifier 128 may comprise a JavaScript module that permits a user at the client admin computer to visually modify a data structure of a document into a desired format. The modification may be performed by, for example, adding labels, re-ordering, moving, deleting, or otherwise changing portions of the data structure and stores the changed, or modified version of the data structure in the database.

In particular, the client admin computer 140 includes a web browser 142, such as Internet Explorer™ by Microsoft Corporation or other suitable web browser for permitting a user at the client admin computer 140 to view pages at the database modifier 128 hosted at the application server 124. The pages at the database modifier 128 of the application server 124 permit user configuration of the FIG. 5 database, as discussed in more detail below.

In general, the formatter 126 receives the document identified by the request from one of the servers 104, 106, 108, divides the document into multiple blocks, and assigns labels to individual blocks. The formatter 126 then generates a list containing the content of the various blocks. If a data structure associated with the document is stored in the database, the formatter 126 then uses the data structure to generate output files from the generated list of content. The output file may contain a Table of Contents (TOC) page and subdocument. The TOC page lists labels associated with the subdocuments and may contain links to the subdocuments. The formatter 126 then transmits the TOC page, a headline, an image, or other content specified by a database at the application server 124 to the client 102 over at least one of the networks 110, 111. Details of the operation of the formatter 126 are discussed in more detail below.

Figure 2:
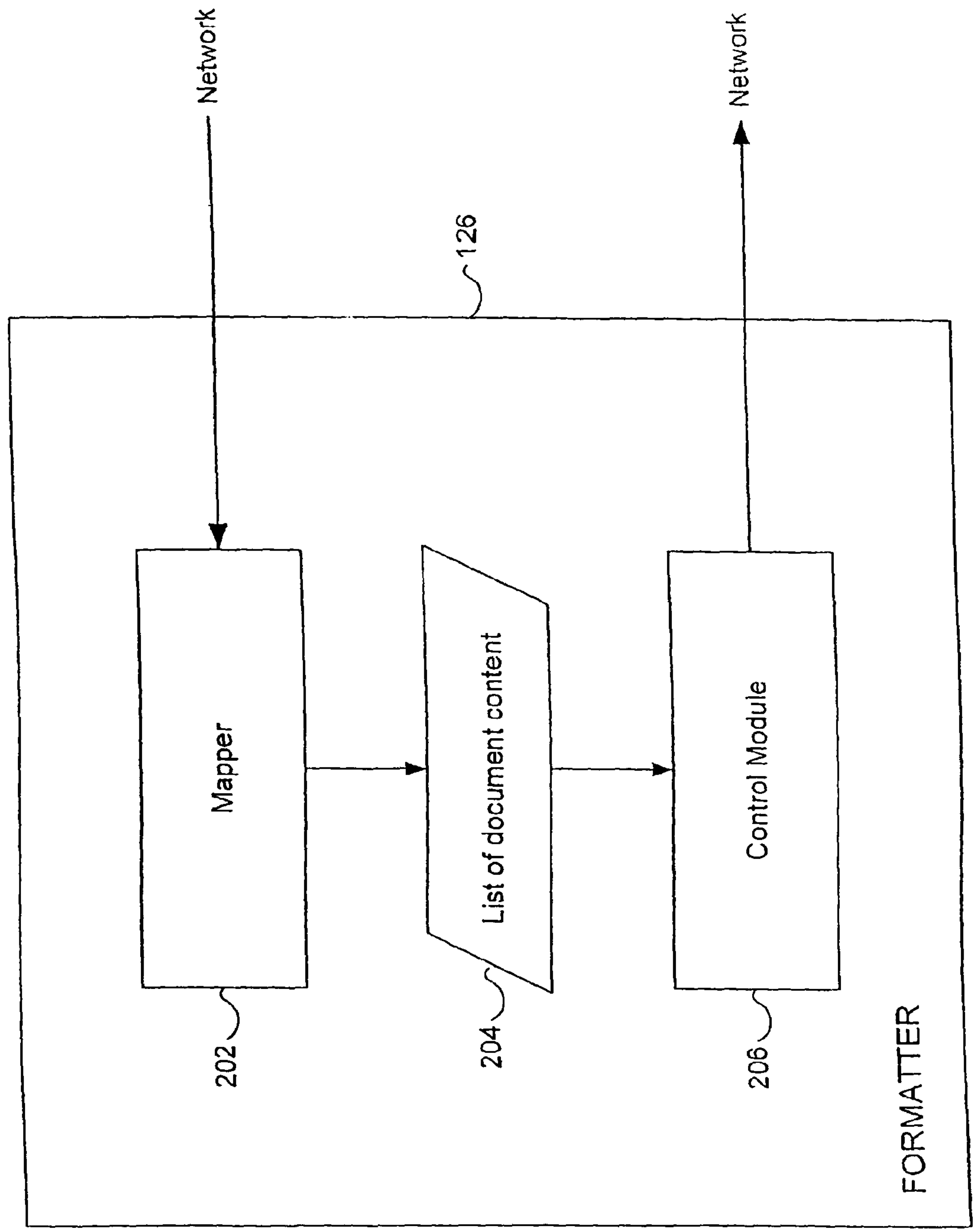
FIG. 2 is a block diagram of the formatter of FIG. 1 in accordance with one embodiment of the present invention.

FIG. 2 illustrates details of the formatter 126 of FIG. 1 according to one embodiment of the invention. As shown, the formatter 126 includes a mapper 202, and a control module 206, which may comprise software written in C++ or other suitable programming language. The mapper 202 receives the requested document and reformats the document as a list of document content 204, The control module 206 then generates an output file using the list document content 204. Additional details regarding the mapper 202, the list of document content 204, and the control module 206 are discussed below.

Figure 3:
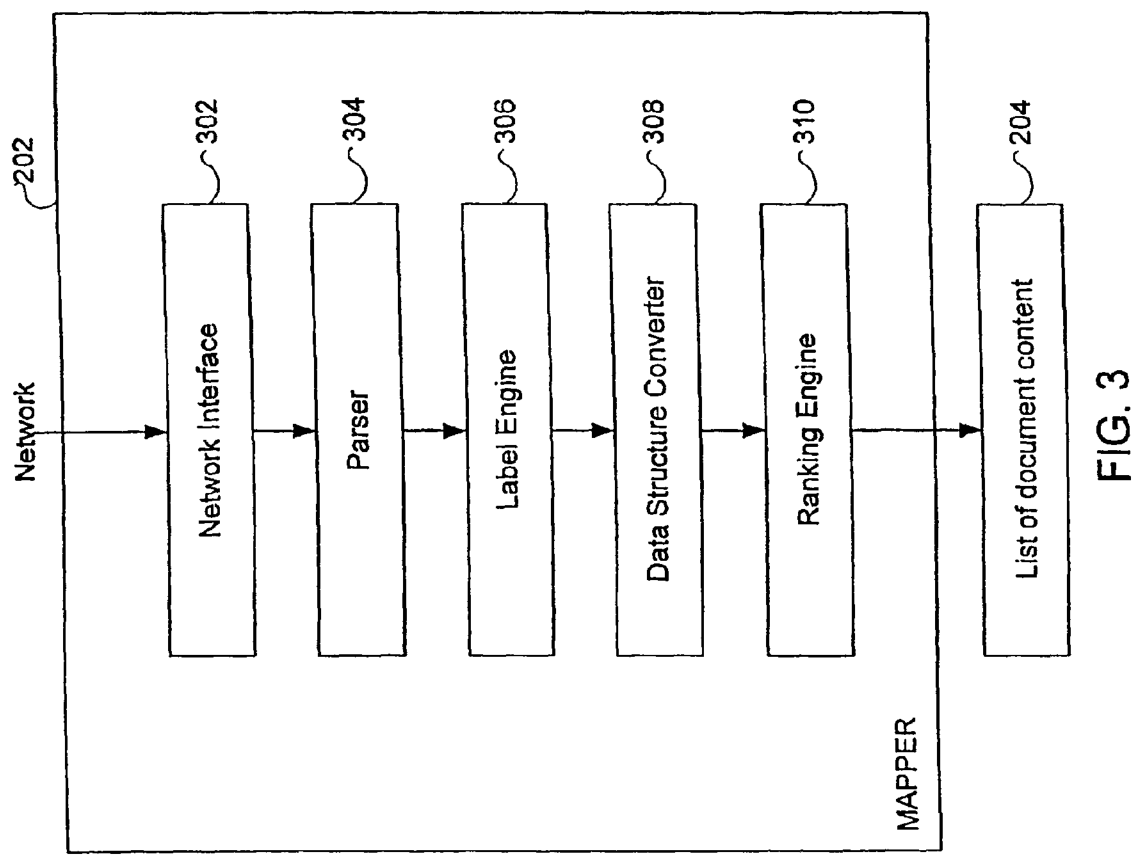
FIG. 3 is a block diagram of the mapper of FIG. 2 in accordance with one embodiment of the present invention.

FIG. 3 illustrates details of the mapper 202 of FIG. 2 according to one embodiment of the invention. The mapper 202 includes a number of software modules stored in a computer readable medium. In particular, the mapper 202 includes a network interface 302, a parser 304, a label engine 306, a data structure converter 308, and a ranking engine 310. The network interface 302 receives the document requested from the network. As mentioned above, the document requested may comprise a web page, such as an HTML document, an XML document, or the like.

Figure 4:
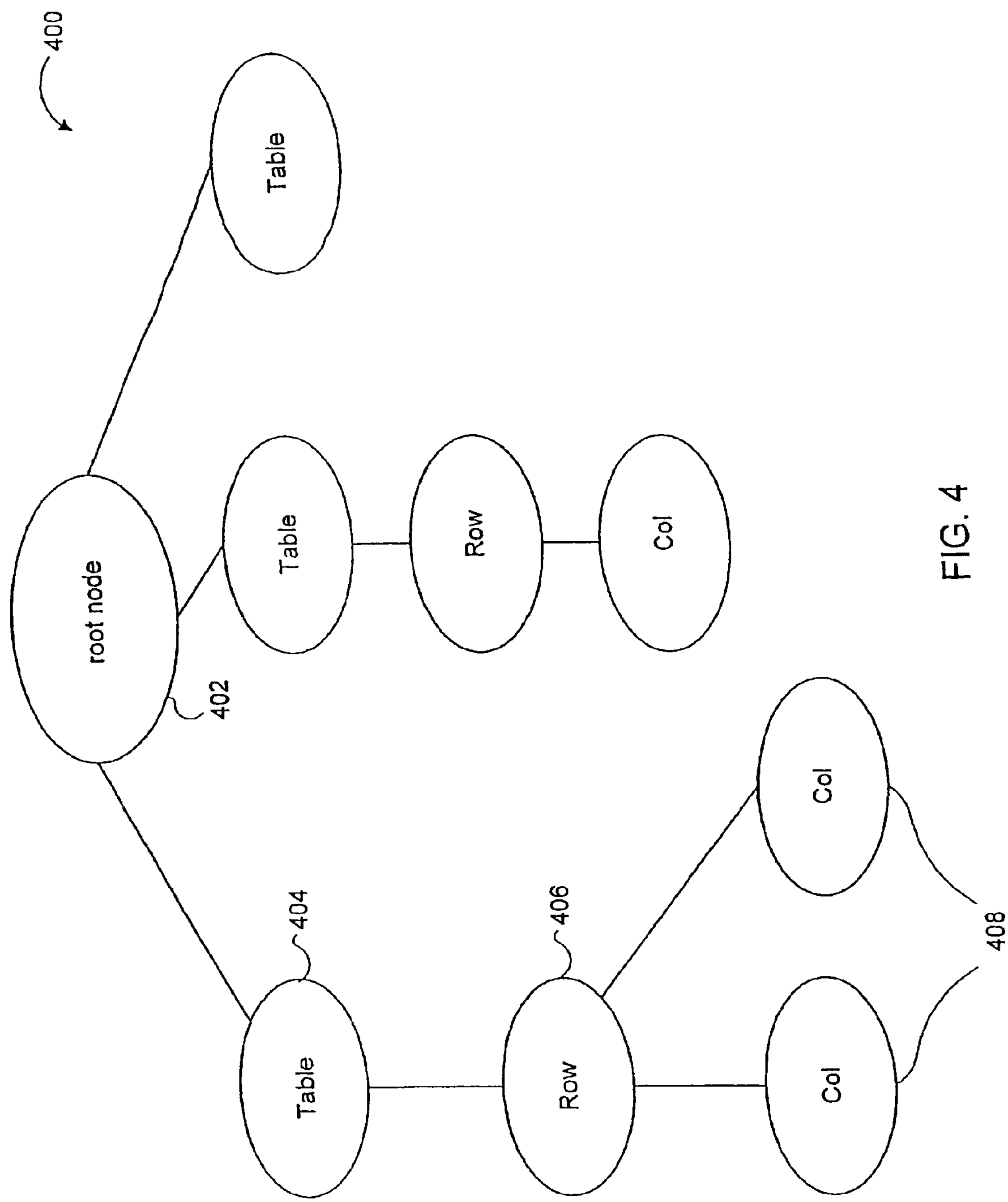
FIG. 4 illustrates a tree data structure in accordance with one embodiment of the present invention.

The parser 304 parses and decomposes the document into a tree data structure. FIG. 4 illustrates an example tree data structure 400, which may comprise a structural representation of a document, such as an HTML web page. As shown, the tree data structure 400 includes a root node 402 associated with the document. The parser 304 (FIG. 3) divides the document into multiple blocks and represents each block of the document as a table node 404 in the tree data structure 400. Each table node 404 has at least one row node 406 as a child node. Individual row nodes 406 each have at least one column node 408 as a child node. The column nodes 408 may then have additional table nodes as children. At this point, the tree data structure 400 may be recursive.

Thus, the document is divided into blocks, which may be defined by the structure of the document. The primary content for each of the blocks, or tables, is stored in the column nodes 408 and the remaining structure of the various blocks is represented in the other portions of the tree data structure 400.

Referring again to FIG. 3, the label engine 306 then assigns labels to individual blocks and may assign a classification to each block according to the contents of the block. In one embodiment, the label engine 306 assigns a classification to each block based on the block contents. For example, if the document is a web page, the web page may include links, text, forms, and pictures, as well as other classes of content.

The label engine 306 optionally analyzes individual blocks and assigns a classification to the block indicating the type, or class, of content in the block. Hence, a block that contains primarily links may be assigned a "navigation" classification, a block that contains primarily text may be assigned a "story" classification, a block that contains primarily pictures may be assigned an "image" classification, and a block that contains form information like an address may be assigned a "form" classification. The label engine 306 inserts a classifier associated with the assigned classification for each block into the table node of each block.

After classifying the blocks, the label engine 306 optionally merges, or combines, column nodes of each block that have the same classification. For example, if a given block has multiple column nodes having the classification of "story," the label engine 306 may merge, or combine, the content of these column nodes. Likewise, if a given block has multiple columns having the classification of "navigation," the label engine 306 may merge, or combine, the content of these column nodes.

In one embodiment, the label engine 306 may merge, or combine, column nodes in accordance with predetermined merging rules stored at the label engine 306. An example merging rule is that a large "story" node is not merged with another large "story" node. Another example merging rule is that a small "story" node may get merged with a "navigation" node. Thus, according to these rules, a large story, which is likely to be substantial enough to be viewed in isolation, will not be combined with another large story. However, a small story would not be isolated. Rather, the user experience may be improved by merging other nodes, such as a small "navigation" node or a small "story" node. The specifics of these merging rules may vary and may be customized according to particular applications. The classifying and merging are optional according to some embodiments of the invention.

The label engine 306 also assigns a label to each block according to the block contents. In one embodiment, the label engine 306 uses the first several words of text of a block including text as the label for that block. In another embodiment, the label engine 306 assigns a label to a block based on the classification of the block. The label engine 306 then adds the assigned label to the table node of the associated block.

With continued reference to FIG. 3, a data structure converter 308 of the mapper 202 next "flattens" the tree data structure by converting the tree data structure into a linear, one-dimensional list containing the content of the column nodes 408. The table nodes 404 and the row nodes 406 are not included in the one-dimensional list. Individual entries in the one-dimensional list include the content of an associated column nodes 408.

A ranking engine 310 then ranks the entries in the one-dimensional list according to the content of the individual entries. In one embodiment, the ranking engine 310 analyzes characteristics of each entry and assigns a "weight" value to each entry. The weight assigned to each entry may be based on a variety of parameters. These parameters may include, for example, the size of the font used in the entry, whether the text in the entry is boldface, the color of the text, whether the text is flashing, whether the text is underlined, and the position of the item in the document.

The ranking engine 310 may also generate a size value indicative of an amount of text in each of the plurality of subdocuments. Pursuant to this embodiment, the size value may be larger for subdocuments comprising large amounts of text and the size value may be smaller for subdocuments comprising smaller amounts of text. Ranking the entries in the table of contents, at least in part, according to the size value tends to make entries associated with larger around of text appear higher on the list of entries in the table of contents (i.e., or more important or more relevant).

In one embodiment, the weight assigned to each entry may also depend on the content of the link leading to the document, the text of the previous document, the text of the subdocument associated with the entry, the text of the label associated with the entry, or a combination of these. Additional details regarding this embodiment are described below with references to FIGS. 7 and 8. Based on parameters such as these, the ranking engine 310 assigns a weight to individual entries in the one-dimensional list and then re-orders the one-dimensional list according to the weighted rankings.

In one embodiment, the ranking engine 310 reorders the list in an order of decreasing weight values such that the first entry in the re-ordered list is the entry having the largest weight value and the last entry in the list is the entry having the smallest weight value. The re-ordered list is then stored as the list of document content 204 (FIG. 2). Thus, in some embodiments, entries having large or bold text may be ranked before entries having smaller or plain text. Also, entries having a graphic may be ranked higher than entries having primarily links.

Figure 5:
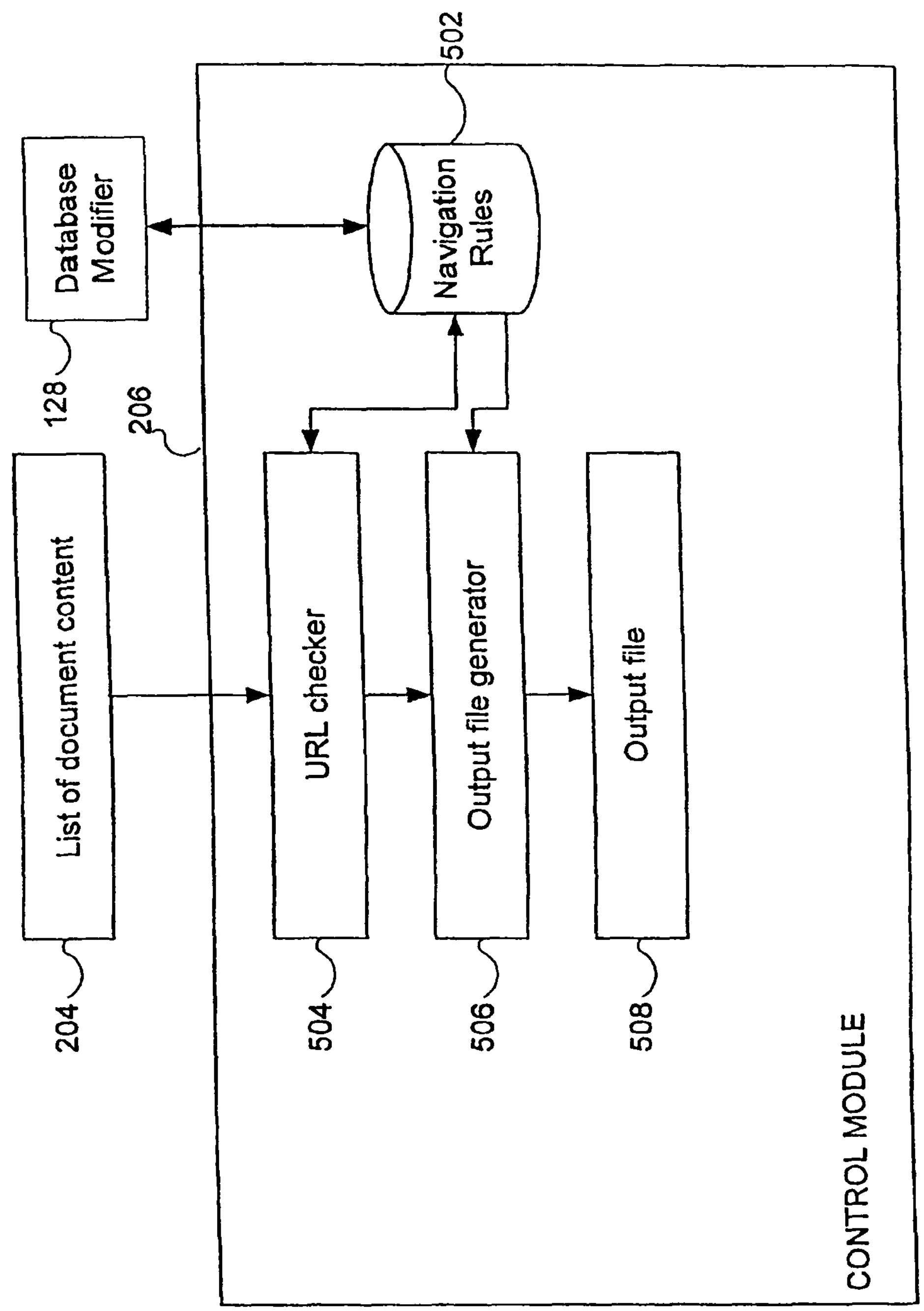
FIG. 5 is a block diagram of the control module of FIG. 2 in accordance with one embodiment of the present invention.

FIG. 5 illustrates details of the control module 206 of FIG. 2 in accordance with one embodiment of the present invention. In general, the control module 206 receives the list of document content 204 and creates a new document structure according to a navigation rules database 502 and the list of document content 204.

The navigation rules database 502 contains a tree data structure for one or more documents. In one embodiment, contents of the navigation rules database 502 may be modified by accessing the formatter 126 (FIG. 1) from a client computer, such as the client admin computer 140 (FIG. 1). The database modifier 128 may modify the contents of the navigation rules database 502 described above.

In particular, the client admin computer 140 includes browser 142 and permits a user to access the database modifier 128 and to modify the contents of the navigation rules database 502. To modify the contents of the navigation rules database 502, a user at the client admin computer 140 directs the browser 142 to the database modifier 128. The database modifier 128 then presents the user with a GUI (Graphical User Interface) via the browser 142 that permits the user to view a default tree data structure, as constructed by the mapper 202, for a given document, such as an HTML or XML web page document. The default tree structure may be the structure of the document at issue as determined by parsing the document.

The user may then delete entries in the tree data structure. The user may alternatively move tree data structure entries from one location to another within the tree data structure. further, the user may change the label or classification assigned to given nodes within the tree data structure. After the user has thus modified, or customized, the tree data structure, the control module 206 stores the modified tree data structure as an entry in the navigation rules database 502 associated with the document.

The control module 206 also includes a URL (Uniform Resource Locator) checker 504. The URL checker 504 receives the list of document content 204 from the mapper 302 and determines whether the navigation rules database 502 includes a tree data structure associated with the list of document content 204. In one embodiment, the URL checker determines whether the URL associated with the list of document content 204 matches a URL associated with an entry in the navigation rules database 502. If such a match exists, an output file generator 506 retrieves the tree data structure in the navigation rules database 502 associated with the list of document content 204. The output file generator 506 then creates one or more output files 508 based on the retrieved tree data structure using the content of the list of document content 204.

The output files 508, in one embodiment, include a table of contents (TOC) page that lists the labels of the document. The output files 508 also contain one or more subdocuments. Individual sub-pages are associated with individual entries in the TOC. One or more of the labels, or entries, of the TOC may include links to associated subdocuments.

If the URL checker 504 determines that the navigation rules database 502 does not include a tree data structure associated with the list of document content 204, then the output file generator 506 generates an out put files 508 that include a OC page that lists the labels of the document. One or more of the labels, or entries, of the TOC may include links to associated subdocuments.

The formatter 126 then transmits the TOC page over at least one of the networks 110, 111 to the client 102. Upon receipt of the TOC page at the client 102, the client 102 displays the TOC page at the display 112 of the client 102. The user may then select a link associated with one of the entries of the TOC, which requests an associated subdocument from the output files 508. In response to a request for a subdocument in the output files 508, the formatter transmits the requested subdocument to the client 102 over at least one of the networks 110, 111 for display at the display 112 of the client 102.

Figure 6:
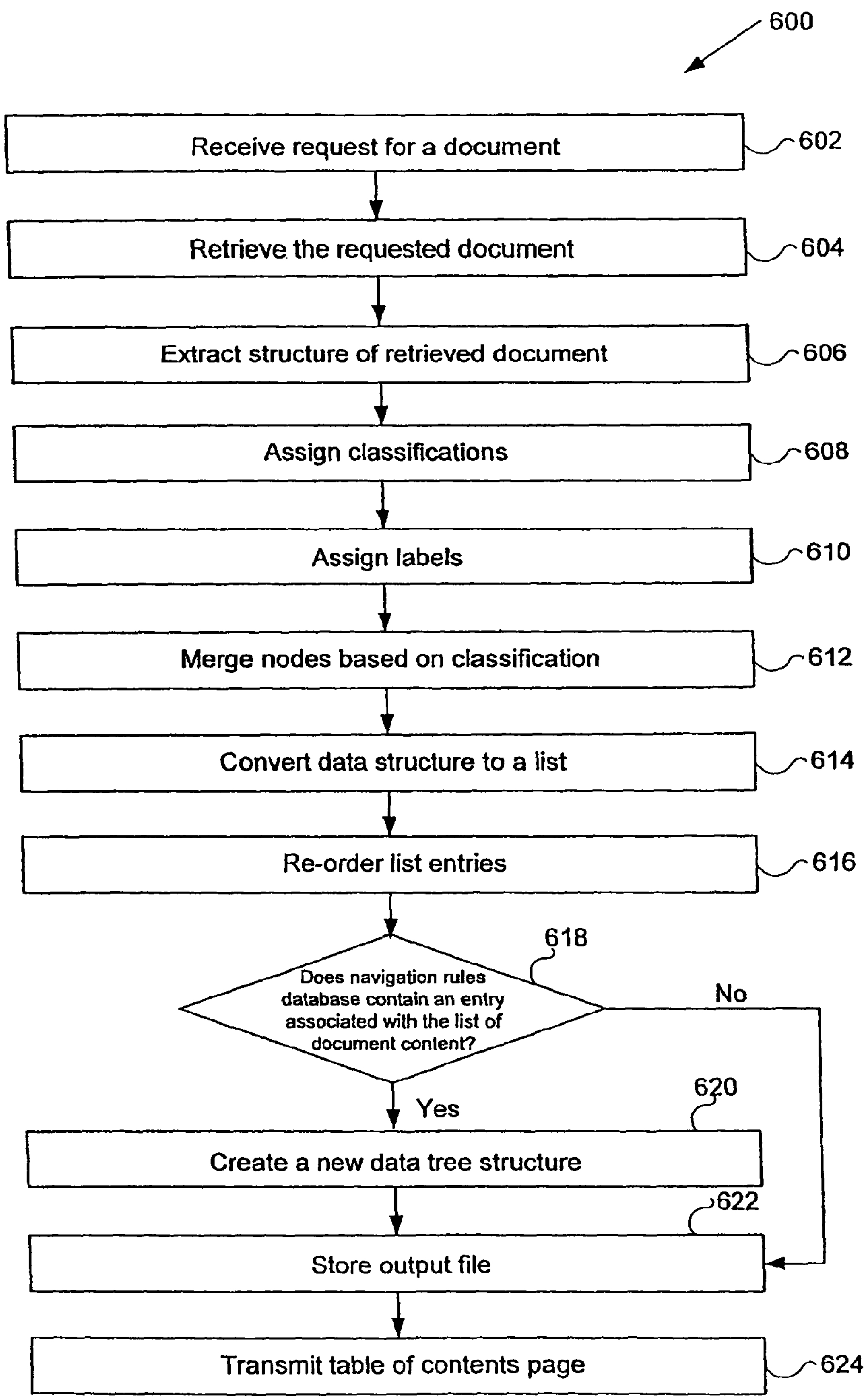
FIG. 6 is a flowchart illustrating a method in accordance with one embodiment of the present invention.

FIG. 6 illustrates a flowchart 600, which depicts a method according to one embodiment of the present invention. The method commences at block 602 where application server 124 receives a request for document from the client 102 (FIG. 1), the requested document residing on at least one of the servers 104, 106, 108. The request for document may be directed to the application server 124 directly. Alternatively, the request for document may be directed directly to one of the servers 104, 106, 108, which, in turn, redirects the request for document to the application server 124. The request for document may comprise an HTTP request or other suitable request. Moreover, the requested document may comprise a document in HTML, XML, PDF, or other suitable format.

Next, at block 604, the application server 124 retrieves the requested document from one or more of the servers 104, 106, 108 on which the document resides. This retrieval may be accomplished by the application server 124 transmitting an HTTP request to the server 104, 106, 108 at which the requested document is stored. For example, if the requested document resides at the server 104, the application server 124 requests the document from the server 104 over the network 110 and receives the requested document over the network 110.

Then, at block 606, the formatter 126 of the application server 124 extracts a structure of the retrieved document. In one embodiment, a parser 304 (FIG. 3) parses the retrieved document and generates a tree data structure representing the structure of the retrieved document. An example of such a tree data structure is illustrated in FIG. 4 and is described above.

For individual nodes of the tree data structure that include document content, the formatter 126 next analyzes the content of the nodes and assigns one of a set of predefined classifiers to each of the nodes based on the content of the nodes, pursuant to block 608. As discussed above, for a node having content comprising primarily text, the label engine 306 of the formatter 126 may assign a "story" classifier to the node. The classifier may comprise a text string or other identifier added to the node.

At block 610, the label engine 306 of the formatter 126 assigns labels to individual nodes of the tree data structure that include document content. The label engine 306 may assign a label based on the content of the node, the assigned classification of the node, or both. In one embodiment, the label engine 306 uses the first several words of nodes having text content as the label for the associated node. The label may indicate the content of the node being labeled.

At block 612, the label engine 306 merges nodes having content according to their classification. For example, if a pair of nodes having content both have the classification "navigation", then the label engine 306 merges the content of these nodes to form a single node that includes the content of the merged nodes. Block 612 may alternatively, or additionally, be performed after block 616. In one embodiment, the merging is performed before and after ranking.

At block 614, the data structure converter 308 of the mapper 202 converts the tree data structure to a list. The data structure converter 308 extracts the nodes of the tree data structure that include content and generates a list comprising the nodes of the tree data structure that include content, without the other associated nodes, such as table and row nodes, which do not include content.

Next, at block 616, the ranking engine 310 (FIG. 3) of the mapper 202 reorders the entries of the list generated at block 614. In one embodiment, the ranking engine 310 assigns a weight value to each of the entries in the list according to certain parameters of the content of the entries, the classification of the list entry, or a combination thereof. Then, the ranking engine 310 reorders the list according to the weight value of the list entries. For example, the ranking engine 310 may order the list entries in order of decreasing weight value. The ranking engine 310 then stores the re-ordered list as the list of document content 204 (FIG. 2).

The control module 206 (FIG. 5) then determines whether the navigation rules database 520 includes an entry associated with the list of document content 204, pursuant to block 618. In one embodiment, the URL checker 504 of the control module 206 determines whether a URL associated with the list of document content 204 matches a URL associated with an entry in the navigation rules database 502. The URL checker 504 determines that the navigation rules database 502 contains an entry associated with the list of document content if such a match exists and execution proceeds to block 620, else execution proceeds to block 622.

At block 620, the output file generator 06 creates a new data tree structure using the list of document content 204 and the associated entry of the navigation rules database 502. The entry of the navigation rules database 502 may specify labels to be assigned to the various nodes, the location of the various nodes within the new data tree structure, and whether certain nodes are included in the new data tree structure. The output file generator 506 then creates a new data tree structure according to the entry in the navigation rules database 502 and inserts the associated content from the list of document content 204 to form a new data tree, which may be stored as the output files 508.

At block 622, the output file generator 506 stores the new data tree structure as the output files 508 if the navigation rules database 502 contains as entry associated with the list of document content 204. Otherwise, the output file generator 506 stores the list of document content as the output files 508 or processes the list of document content from memory. Moreover, the output file generator 506 may generate device-specific output.

The output files 508 include a table of contents (TOC) page that lists the labels of the nodes having content and subdocuments that include the content of blocks associated with the labels. Each of the subdocuments is associated with one of the links so that a user at the client 102 may request a subdocument by selecting the link associated therewith.

Lastly, pursuant to block 624, the formatter 126 transmits the TOC page to the client 102.

Figure 7:
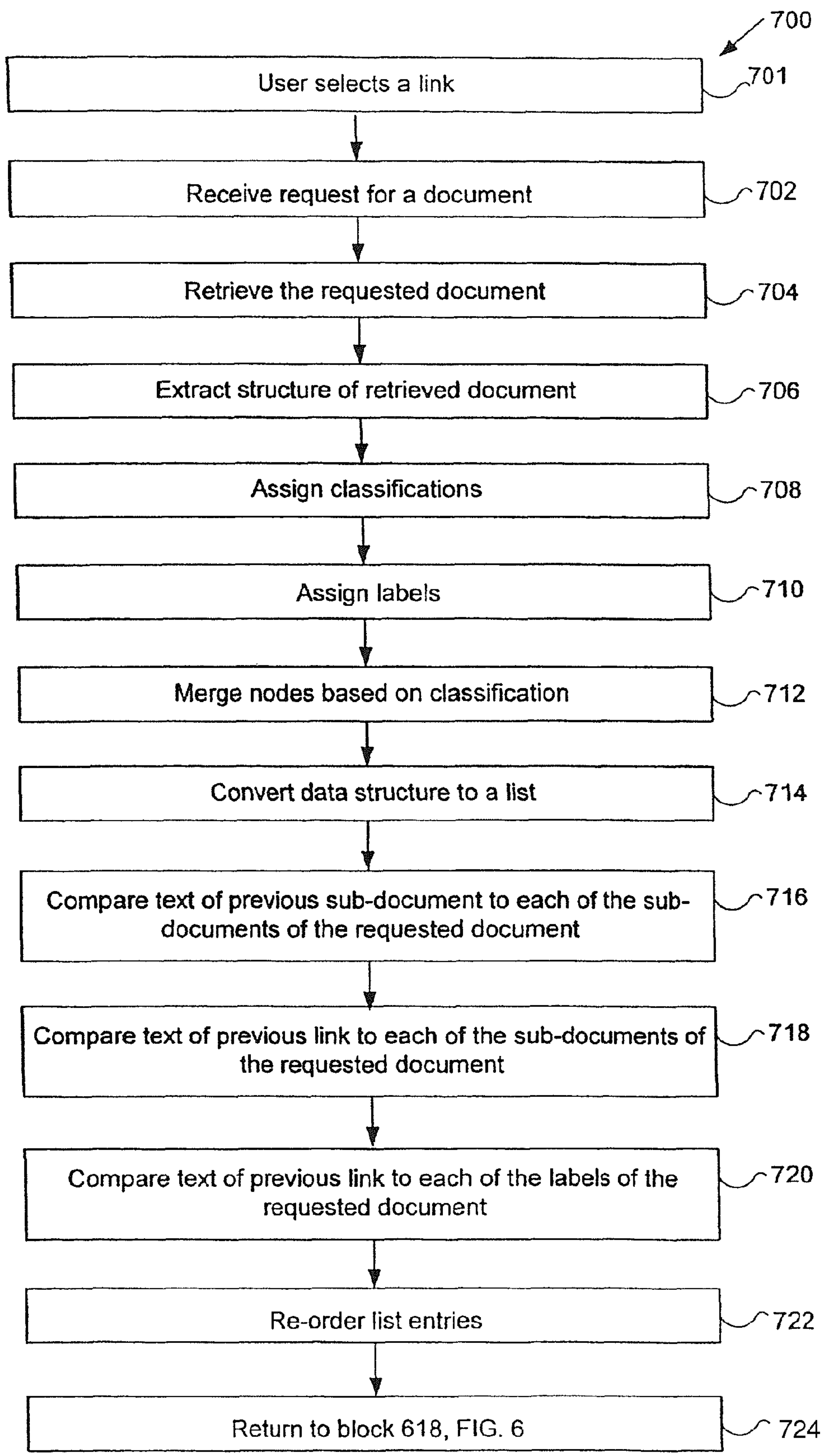
FIG. 7 is a flowchart illustrating a method in accordance with another embodiment of the present invention.
Figure 8:
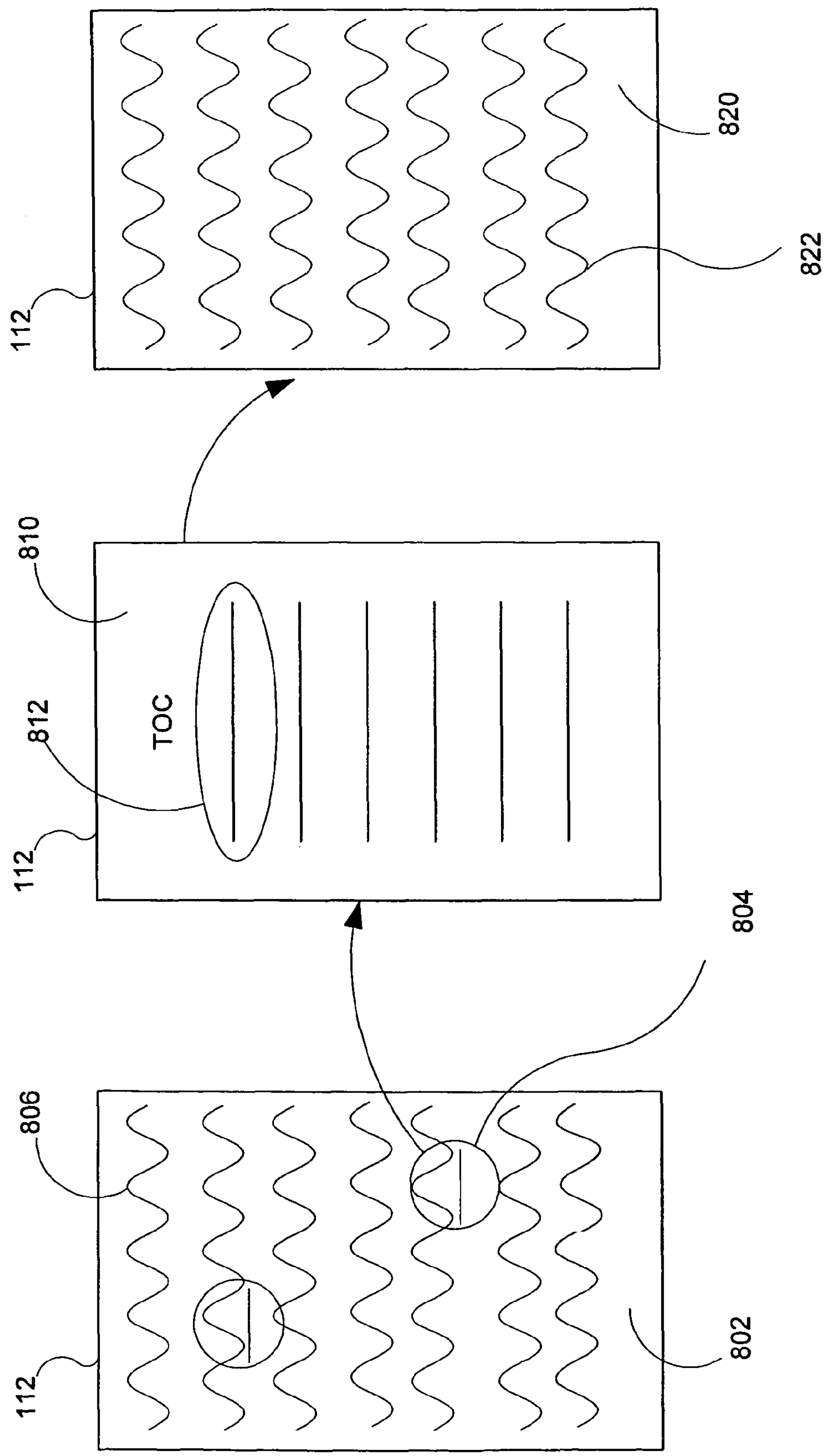
FIG. 8 illustrates a progression of material displayed at the display of the client device of FIG. 1 in accordance with an embodiment of the present invention.

FIGS. 7 and 8 illustrate details of one embodiment of the operation of the ranking engine 310 described above and illustrated in FIG. 3. Since, according to some embodiments, each document is analyzed individually and independently, when a body of text is followed from one document to another, tracking the body of text is a consideration for the ease of reading the body of text and navigating a set of documents. Indeed it is common for a story to begin on a first document and extend to a second document. Hence, in some applications, it may be desirable to facilitate identification of the continuing portion of the story within the second document, which may be divided into multiple subdocuments.

With reference to FIG. 8, the display 112 of the client device 102 (FIG. 1) displays a subdocument 802 containing text 806 and one or more links 804. The link 804 is a selectable connection (e.g., a hyperlink) from a word, a set of words, or other information object, to another. One implementation of the link 804 is a highlighted set of words, or text, that can be selected by a user, such as with a mouse or by touch-screen control, resulting in the immediate delivery and view of another file. The highlighted text may be referred to as an anchor.

FIG. 7 is a flowchart illustrating a method 700 in accordance with one embodiment of the present invention. FIG. 8 illustrates an example sequence of material displayed at the display 112 (see FIG. 1). In general, user selection of the link 804 causes the client 102 to transmit a request for an associated file, such as a document, from the application server 124. As discussed above with reference to FIG. 6, when a document is thus requested, the application server 124 generates a table of contents page 810, including a list of labels, with each label being associated with a subdocument.

It is desirable in some applications that the label associated with the selected link 804 be at or near the top of the list of labels in the table of contents page 810 to facilitate navigation and to permit the user to easily locate the label associated with the selected link. Thus, is desirable that the label 812 of the table of contents page 810 be associated with the selected link to permit the user to quickly and easily identify the subdocument associated with the selected link 804. The user may then select the label 812, which comprises a link to the subdocument 820 containing the text 822.

Referring to FIGS. 7 and 8, the user at a client 102 (FIG. 1) views a subdocument 802 at a display 112 of the client 102, As shown in FIG. 8, the subdocument 802 includes text 806 and one or more links 804. Pursuant to block 701 of FIG. 7, the user selects one of the links 804 of the subdocument 802.

The user selection of the link 804 pursuant to block 701 causes the client 102 to transmit a request for a document associated with the link 804 selected by the user. Pursuant to block 702, the application server 124 receives the request for document from the client 102 (FIG. 1), the requested document residing on at least one of the servers 104, 106, 108. The request for document may be directed to the application server 124 directly or to one of the servers 104, 106, 108, which, in turn, redirects the request for document to the application server 124.

Next, at block 704, the application server 124 retrieves the requested document from one or more of the servers 104, 106, 108 on which the document resides. This retrieval may be accomplished as described above. At block 706, the formatter 126 of the application server 124 extracts a structure of the retrieved document as described above.

For individual nodes of the tree data structure that include document content, the formatter 126 next analyzes the content of the nodes and assigns one of a set of predefined classifiers to each of the nodes based on the content of the nodes, pursuant to block 708 as discussed above. At block 710, the label engine 306 of the formatter 126 assigns labels to individual nodes of the tree data structure that include document content as discussed above. At block 712, the label engine 306 merges nodes having content according to their classification and, at block 714, the data structure converter 308 of the mapper 202 converts the tree data structure to a list, as discussed above.

At block 716, the ranking engine 310 (FIG. 3) compares the text 806 of the previous subdocument 802 to each of the subdocuments of the requested document using conventional document, or text, matching techniques to determine the extent to which the previous subdocument is associated with each of the subdocuments of the requested document. The ranking engine 310 may employ an n-dimensional vector matching technique for comparing the text of the previous subdocument 802 to each of the subdocuments of the requested document. *Modern Information Retrieval*, by R. Baeza-Yates, et al., published by Addison-Wesley Pub. Co.; 1999, ISBN: 020139829X, discloses related techniques and is incorporated herein by reference.

In comparing the text 806 of the previous subdocument 802 to each of the subdocuments of the requested document, the ranking engine 301 generates a document/document value for each of the subdocuments of the requested document. The document/document value indicates the degree to which there is an association between the text 806 of the previous subdocument 802 to each of the subdocuments of the requested document. For example, if the text 806 of the subdocument 802 included the terms such as "XYZ," "merger," "corporate," "shareholders" and the like, the ranking engine 301 would assign a higher degree of association, and thus either a higher or lower document/document value, to subdocuments in the requested page that include the same or similar terms.

At block 718, the ranking engine 310 (FIG. 3) compares the text of the selected link 804 to each of the subdocuments of the requested document. For example, if the selected link 804 comprised the text "XYZ merger" the ranking engine 310 would determine the degree to which the text "XYZ merger" is present in each of the subdocuments of the requested document. The ranking engine 301 generates a link/document value for each of the subdocuments of the requested document. The link/document value indicates the degree to which the text of the selected link is present in each of the subdocuments of the requested document.

At block 720, the ranking engine 310 compares the text of the selected link 804 to each of the labels of the requested document. For example, if the selected link 804 comprised the text "XYZ merger" the ranking engine 310 would determine the degree to which the text "XYZ merger" is present in each of the labels assigned to the requested document and would generate a link/label value for each of the subdocuments of the requested document. The link/label value indicates the degree to which the text of the selected link and the subdocuments of the requested document are related.

The ranking engine 310 may also use additional factors in reordering the list entries. For example, the ranking engine may generate a size value indicative of an amount of text in each of the plurality of subdocuments. Pursuant to this embodiment, the size value may be larger for subdocuments comprising large amounts of text and the size value may be smaller for subdocuments comprising smaller amounts of text. Ranking the entries in the table of contents, at least in part, according to the size value tends to make entries associated with larger amount of text appear higher on the list of entries in the table of contents.

At block 722, the ranking engine 310 reorders the list entries according to the document/document value, the link/document value, the link/label value or a combination of these values. In one example embodiment, the ranking engine 310 assigns a weight to each of the document/document, link/document, and link/label values and then combines the weighted values to determine the reordering of the list entries. Pursuant to another embodiment, the ranking engine 310 reorders the list entries according to one or more of the document/document, link/document, and link/label values and other factors, including, for example, amount of content in the subdocument, the size of the font used in the subdocument, whether the text in the subdocument is boldface, the color of the text in the subdocument, whether the text of the subdocument is flashing, and the position of the item in the document.

After the ranking engine 310 has reordered the list entries, execution returns to block 618 of the flowchart of FIG. 6 as described above. Performing one or more of the blocks 716, 718, 720 together with the block 722 improves user navigation. In particular, this functionality increases the probability that the label listed at or near the top of the table of contents 810 will be associated with the selected link, the text of the subdocument including the selected link, or both.

The above-described embodiments of the present invention are meant to be merely illustrative and not limiting. Thus, those skilled in the art will appreciate that various changes and modifications may be made without departing from this invention in its broader aspects. Therefore, the appended claims encompass such changes and modifications as fall within the scope of this invention.

We claim:

1. A method comprising:

transmitting a first document from a server to a client device, the first document comprising a first subdocument including a text and a link for display on a display of the client device;

receiving, at the server, a request from the client device for a second document, the request for the second document received via the link included in the first subdocument of the first document, the first document being different from the second document;

dividing the second document into second subdocuments, each of the second subdocuments including text;

assigning a label to each of the second subdocuments of the second document;

a ranking engine of the server comparing the text of the first subdocument included in the first document with the text of each of the second subdocuments included in the second document;

the ranking engine generating a document-document value for each of the plurality of second subdocuments according to a degree of association between the text of the first subdocument and the text of the corresponding one of the second subdocuments;

the ranking engine ranking in ranked order the plurality of second subdocuments based, at least in part, on the document-document values indicating the degree of association between the text of the first subdocument included in the first document and the text of the corresponding one of the second subdocuments included in the second document; and transmitting to the client device a response configured to communicate the ranking of the plurality of second subdocuments in the ranked order for display on the display of the client device.

2. The method of claim 1, wherein the link comprises text, the method further comprising:

comparing the text of the link with the text of each of the second subdocuments to generate a link-text value for each of the plurality of second subdocuments according to a degree of association between the text of the link and the text of the corresponding one of the second subdocuments; and ranking in ranked order the plurality of second subdocuments based, at least in part, on the link-text values.

3. The method of claim 1, wherein the link comprises text, the method further comprising:

comparing the text of the link with the label assigned to each of the plurality of second subdocuments to generate a link-label value for each of the plurality of second subdocuments according to a degree of association between the text of the link and the label assigned to the corresponding one of the second subdocuments; and ranking in ranked order the plurality of second subdocuments based, at least in part, on the link-label values.

4. The method of claim 1, further comprising:

receiving the request for the second document associated with the link from the client device in response to selection of the link displayed on the display of the client device.

5. The method of claim 1, further comprising:

generating a size value indicative of an amount of text in each of the plurality of second subdocuments; and ranking in ranked order the plurality of second subdocuments based, at least in part, by the size value.

6. The method of claim 2, further comprising:

generating a size value indicative of an amount of text in each of the plurality of second subdocuments; and ranking in ranked order the plurality of second subdocuments based, at least in part, by the size value.

7. The method of claim 3, further comprising:

generating a size value indicative of an amount of text in each of the plurality of second subdocuments; and ranking in ranked order the plurality of second subdocuments based, at least in part, by the size value.

8. The method of claim 2, wherein the link comprises text, the method further comprising:

comparing the text of the link with the label assigned to each of the plurality of second subdocuments to generate a link-label value for each of the plurality of second subdocuments according to a degree of association between the text of the link and the label assigned to the corresponding one of the second subdocuments; and ranking in ranked order the plurality of second subdocuments based, at least in part, on the link-label values.

9. The method of claim 1, further comprising modifying the ranked order according to a predefined order defined by a data structure.

10. A method comprising:

transmitting a first document from a server to a client device, the first document comprising a first subdocument including a text and a link for display on a display of the client device;

receiving, at the server, a request from the client device for a second document external from the first document, the request for the second document received via the link included in the first subdocument of the first document;

dividing the second document into second subdocuments, each of the second subdocuments including text;

assigning a label to each of the second subdocuments;

a ranking engine of the server comparing the text of the link included in the first document with the text of each of the second subdocuments included in the second document;

the ranking engine generating a link-text value for each of the plurality of second subdocuments according to a degree of association between the text of the link and the text of the corresponding one of the second subdocuments;

the ranking engine ranking in ranked order the plurality of second subdocuments based, at least in part, on the link-text values; and communicating the ranking of the plurality of second subdcouments in the ranked order for display on the display of the client device.

11. The method of claim 10, wherein the link comprises text, the method further comprising:

comparing the text of the link with the label assigned to each of the plurality of second subdocuments to generate a link-label value for each of the plurality of second subdocuments according to a degree of association between the text of the link and the label assigned to the corresponding one of the second subdocuments; and ranking in ranked order the plurality of second subdocuments based, at least in part, on the link-label values.

12. The method of claim 10, further comprising:

receiving the request for the second document associated with the link from the client device in response to selection of the link displayed on the display of the client device.

13. The method of claim 10, further comprising:

generating a size value indicative of an amount of text in each of the plurality of second subdocuments; and ranking in ranked order the plurality of second subdocuments based, at least in part, by the size value.

14. A method comprising:

transmitting a first document from a server to a client device, the first document comprising a first subdocument including a text and a link for display on a display of the client device;

receiving, at the server, a request from the client device for a separate, second document, the request for the second document received via the link included in the first subdocument of the first document;

dividing the second document into second subdocuments, each of the second subdocuments including text;

assigning a label to each of the second subdocuments;

a ranking engine of the server comparing the text of the link included in the first document with the label assigned to each of the plurality of second subdocuments included in the second document;

the ranking engine generating a link-label value for each of the plurality of second subdocuments according to a degree of association between the text of the link and the label assigned to the corresponding one of the second subdocuments;

the ranking engine ranking in ranked order the plurality of second subdocuments based, at least in part, on the link-label values; and communicating a list of the plurality of second subdocuments in the ranked order to the client device to enable presentation of the list via the client device.

15. The method of claim 14, further comprising:

receiving the request for the second document associated with the link from the client device in response to selection of the link displayed on the display of the client device.

16. The method of claim 15, further comprising:

generating a size value indicative of an amount of text in each of the plurality of second subdocuments; and ranking in ranked order the plurality of second subdocuments based, at least in part, by the size value.

17. A method comprising:

transmitting a first document from a server to a client device, the first document comprising a first subdocument including a text and a link for display on a display of the client device;

receiving, at the server, a request from the client device for a second document, the request for the second document received via the link included in the first subdocument of the first document, the first document being distinct from the second document;

dividing the second document into second subdocuments, each of the second subdocuments including text;

a ranking engine of the server comparing the text of the first subdocument included in the first document with the text of each of the second subdocuments included in the second document;

the ranking engine generating a document-document value for each of the plurality of second subdocuments according to a degree of association between the text of the first subdocument and the text of the corresponding one of the second subdocuments; the ranking engine comparing the text of the link included in the first document with the label assigned to each of the plurality of second subdocuments included in the second document;

the ranking engine generating a link-label value for each of the plurality of second subdocuments according to a degree of association between the text of the link and the label assigned to the corresponding one of the second subdocuments;

the ranking engine comparing the text of the link included in the first document with the text of each of the second subdocuments included in the second document;

the ranking engine generating a link-text value for each of the plurality of second subdocuments according to a degree of association between the text of the link and the text of the corresponding one of the second subdocuments; and the ranking engine ranking in ranked order the plurality of second subdocuments based, at least in part, on the document-document, link-label, and the link-text values;

transmitting to the client device a response configured to communicate the ranking of the plurality of second subdocuments in the ranked order for use by the client device.

18. The method of claim 17, further comprising:

generating a size value indicative of an amount of text in each of the plurality of second subdocuments; and ranking in ranked order the plurality of second subdocuments based, at least in part, by the size value.

19. A method comprising:

transmitting a first document from a server to a client device, the first document comprising a first subdocument including a text and a link for display on a display of the client device;

receiving, at the server, a request from the client device for a second document, the request for the second document received via the link included in the first subdocument of the first document;

dividing the second document into second subdocuments, each of the second subdocuments including text;

assigning a label to each of the second subdocuments;

comparing the text of the first subdocument included in the first document with the text of each of the second subdocuments included in the second document to generate a document-document value for each of the plurality of second subdocuments according to a degree of association between the text of the first subdocument and the text of the corresponding one of the second subdocuments;

assigning a weight to each generated document-document value;

ranking in ranked order the plurality of second subdocuments based, at least in part, on the document-document values and the assigned weights;

transmitting to the client device a list of the labels associated with the plurality of second subdocuments in the ranked order to enable display via the client device.

* * * * *